US008938142B2

(12) United States Patent
Shastri et al.

(10) Patent No.: US 8,938,142 B2
(45) Date of Patent: Jan. 20, 2015

(54) SILICON-BASED OPTO-ELECTRONIC INTEGRATED CIRCUIT WITH REDUCED POLARIZATION DEPENDENT LOSS

(75) Inventors: Kalpendu Shastri, Orefield, PA (US); Raymond Nering, Fanwood, NJ (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 13/324,251

(22) Filed: Dec. 13, 2011

(65) Prior Publication Data

US 2012/0155799 A1 Jun. 21, 2012

Related U.S. Application Data

(60) Provisional application No. 61/423,432, filed on Dec. 15, 2010.

(51) Int. Cl.
*G02B 6/30* (2006.01)
*G02B 6/42* (2006.01)

(52) U.S. Cl.
CPC ............... *G02B 6/4246* (2013.01); *G02B 6/42* (2013.01); *G02B 6/305* (2013.01); *G02B 6/421* (2013.01); *G02B 6/4213* (2013.01)
USPC ................... 385/50; 385/31; 385/88

(58) Field of Classification Search
CPC .................................. G02B 6/30; G02B 6/305
USPC .............................. 385/33–35, 43, 49–50, 14
See application file for complete search history.

(56) References Cited

U.S. PATENT DOCUMENTS

| | | |
|---|---|---|
| 6,487,341 B1 | 11/2002 | Chen et al. |
| 6,853,758 B2 | 2/2005 | Ridgway et al. |
| 7,415,184 B2 | 8/2008 | Ghiron et al. |
| 7,421,156 B1 | 9/2008 | Liu et al. |
| 7,492,983 B2 | 2/2009 | Matsubara et al. |
| 7,577,324 B2 | 8/2009 | Liu et al. |
| 7,577,327 B2* | 8/2009 | Blauvelt et al. .................. 385/39 |
| 7,734,191 B1 | 6/2010 | Welch et al. |
| 2006/0093369 A1 | 5/2006 | Nagarajan |
| 2007/0189688 A1 | 8/2007 | Dehlinger et al. |
| 2008/0105940 A1 | 5/2008 | Piede et al. |
| 2009/0285522 A1 | 11/2009 | Gomiyou et al. |

FOREIGN PATENT DOCUMENTS

| | | |
|---|---|---|
| KR | 10-2004-0006590 | 1/2004 |
| KR | 10-2004-0099659 | 12/2004 |

OTHER PUBLICATIONS

Feuchter, Thomas et al., "High Precision Planar Waveguide Propagation Loss Measurement Technique Using a Fabry-Perot Cavity", IEEE Photonics Technology Letters, vol. 6, No. 10, Oct. 1994, pp. 1244-1247.

* cited by examiner

*Primary Examiner* — Jerry Rahll
(74) *Attorney, Agent, or Firm* — Patterson & Sheridan, LLP

(57) ABSTRACT

A silicon-based opto-electronic circuit is formed to exhibit reduced polarization-dependent loss by strategically placing the photodetecting device as close as possible to the entry point of the optical signal into the opto-electronic circuit arrangement. While the incoming optical signal will include both TE and TM modes, by minimizing the length of the optical waveguide path along which the signal must propagate before reaching a photodetector, the attenuation associated with TM mode signal will be negligible.

19 Claims, 4 Drawing Sheets

SILICON-BASED OPTO-ELECTRONIC INTEGRATED CIRCUIT WITH REDUCED POLARIZATION DEPENDENT LOSS

CROSS-REFERENCE TO RELATED APPLICATIONS

This application claims the benefit of U.S. Provisional Application 61/423,432, filed Dec. 15, 2010 and herein incorporated by reference.

TECHNICAL FIELD

The present invention relates to a silicon-based opto-electronic integrated circuit and, more particularly, to an opto-electronic integrated circuit with reduced polarization dependent loss.

BACKGROUND OF THE INVENTION

Optical networking, including fiber-optics and optoelectronics, is an important aspect of high speed communication systems, particularly for its ability to allow for efficient, accurate, and rapid transmission of data between various components in the network system. As with most communication systems, the efficient use of space and power in optical networks is of ever-increasing importance. Further, design considerations for such networks must take into account the modularity of the particular components that are included in the network.

Indeed, modular components are desirable in fiber optic systems to reduce the cost of manufacturing the system, which increases as the system becomes more customized. This is at least one reason that silicon-on-insulator (SOI)-based optical components are becoming a preferred alternative, where optical elements such as lasers, photodiodes, active optical devices and passive optical devices are mounted on (or integrated within) the same SOI substrate as the associated optical waveguides. In some cases, the electrical integrated circuits (ICs) used to control the active optical devices are mounted on/integrated within a common SOI substrate with the optics.

An example of a modular component is an optical receiver module, which may also be a portion of a complete optical transceiver assembly (including both an optical transmitter module and an optical receiver module), or an optical transponder further comprising wavelength multiplexing/demultiplexing. A typical optical receiver module includes an input port/channel for an optical fiber (or other light propagating arrangement), a photodiode for detecting the incoming optical signals, and a sensing circuit for converting the optical signals to digital electrical signals compatible with other network components, with silicon-based optical waveguides used to interconnect these various components.

While such a modular component exhibits a significant improvement in reduced cost when compared to discrete element arrangements, a problem remains in that the silicon-based optical waveguides utilized in the modular are subject to polarization-dependent loss. That is, the propagation constants for the TE (transverse electric) and TM (transverse magnetic) modes of a silicon waveguide are different, and an optical signal of mixed polarization propagating along the waveguide will experience a greater degree of attenuation in one polarization mode with respect to the other.

To overcome this loss, polarization diversity optics are often employed to split an optical signal along two separate polarization-maintaining waveguides, with the TE mode signal retained along a first waveguide and the TM mode signal re-oriented along the second waveguide to align with the TE mode. Obviously, the need to introduce polarization diversity optics adds cost to the final assembly.

Thus, a need remains to reduce the polarization-dependent problems associated with the utilization of modular optical components.

SUMMARY OF THE INVENTION

The present invention addresses the polarization dependent loss problem associated with optical waveguides in an opto-electronic circuit arrangement by strategically placing a photodetecting device as close as possible to the entry point of the optical signal into the opto-electronic circuit arrangement. While the incoming optical signal will include both TE and TM modes, by minimizing the length of the optical waveguide path along which the signal must propagate before reaching a photodetecting device, the attenuation associated with TM mode signal will be negligible.

In one embodiment, the present invention comprises a silicon-based opto-electronic circuit formed on a silicon substrate and including at least an optical receiving component, the circuit comprising an optical waveguide formed in the silicon substrate for receiving an incoming optical signal exhibiting both transverse electric (TE) and transverse magnetic (TM) components, and a photodetecting device disposed contiguous to the optical waveguide for capturing the received optical signal and converting the received optical signal into an electrical equivalent, where the optical waveguide is configured to have a short length such that polarization dependent loss associated the TM component of the received optical signal is negligible (e.g., perhaps less than 1 dB, or less than the maximum allowable system-level tolerance to signal variation, while maintaining adequate signal integrity).

In one embodiment, the relatively short waveguide along which the mixed polarization optical signal is propagating includes a coupling scheme that comprises a nanotaper coupling end termination where the signal is introduced to the silicon substrate. A nanotaper coupling end termination may be utilized to improve the coupling efficiency between the incoming signal and the waveguide. In general, however, any suitable type of coupling scheme may be used. Additionally, it is also possible to fabricate the relatively short waveguide from the same material that used to form the photodetecting device, thus combining the functions of coupling and photodetecting.

Other and further aspects and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
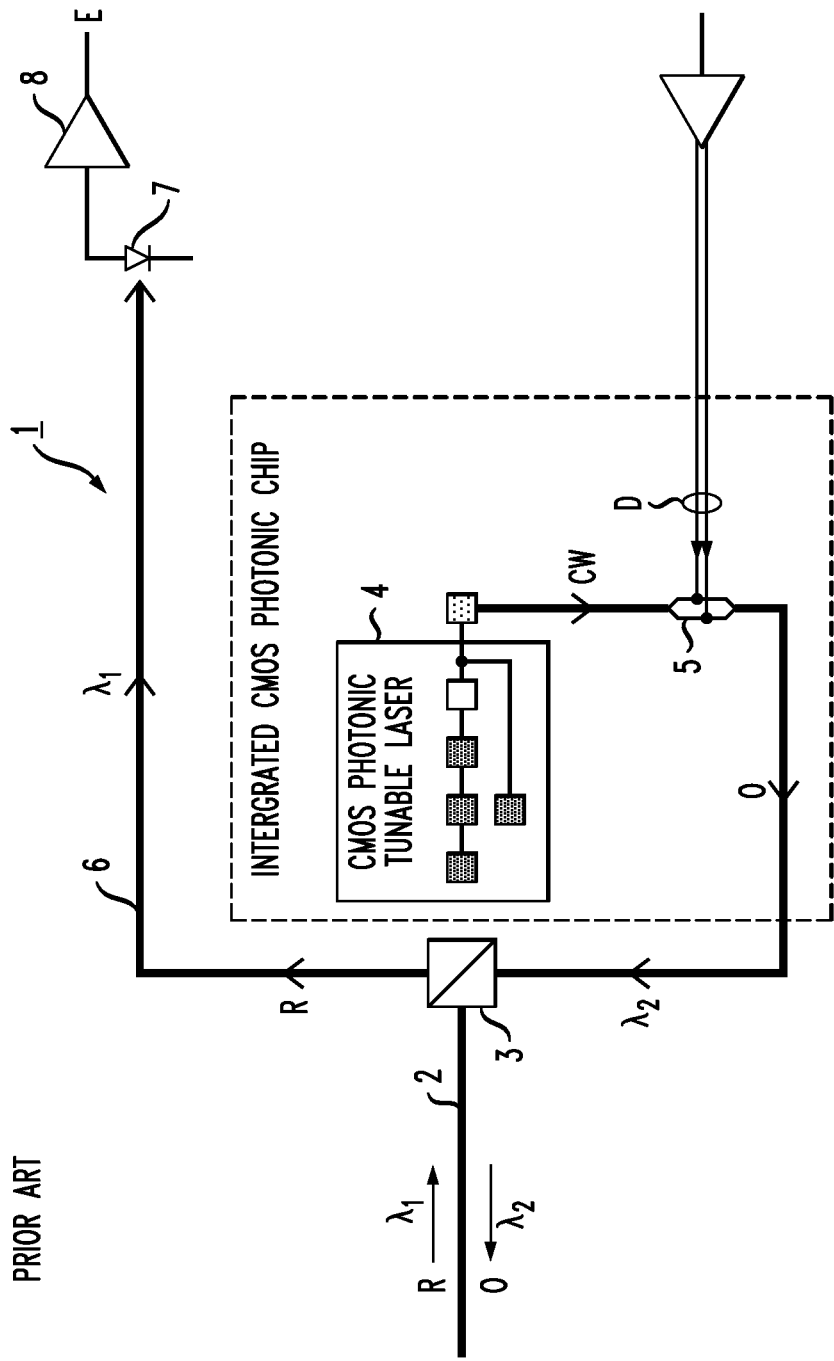
FIG. 1 illustrates a prior art opto-electronic integrated circuit, including a relatively long optical waveguide signal path between the entry to the circuit and the photodetecting device.

FIG. 1 illustrates an exemplary prior art opto-electronic integrated circuit 1, utilizing a single incoming optical waveguide 2 (at times, an optical fiber) to transmit optical signals between opto-electronic integrated circuit 1 and other, external components (not shown). In this particular configuration, a wavelength division multiplexer (WDM) 3 is used to separate the "incoming"/received optical signals R (operating at a first wavelength $\lambda_1$) from the "outgoing"/transmitted optical signals O (operating at a second wavelength $\lambda_2$). Opto-electronic integrated circuit 1 comprises a silicon-on-insulator (SOI)-based circuit, utilizing a silicon substrate as the platform upon which the individual components are mounted and a relatively thin (i.e., less than one micron in thickness) silicon surface layer within which optical waveguides are formed.

In a conventional manner, and not particularly relevant to the subject matter of the present invention, a tunable laser source 4 is used to create a CW optical signal which is thereafter applied as an input in this example to a modulator 5. Electrical digital data input signals D are used to modulate the CW optical input to modulator 5 and create the modulated optical output signal O which is thereafter passed through WDM 3 to be coupled into optical waveguide 2.

Of more concern to the subject matter of the present invention is the process of recovering an incoming electrical data signal from received optical signal R. As shown in FIG. 1, received optical signal R propagates along waveguide 2 is coupled into WDM 3, which will then direct the specific wavelength associated with the incoming signal into an optical waveguide 6. Optical signal R propagates along waveguide 6 until it reaches a photodiode 7, which functions to convert the optical signal into an equivalent electrical signal. In a conventional manner well-known in the art, the electrical signal is amplified (for example, in a transimpedance amplifier 8) and further treated to generate a relatively "clean" electrical signal E with an acceptable bit error rate (BER).

Figure 2:
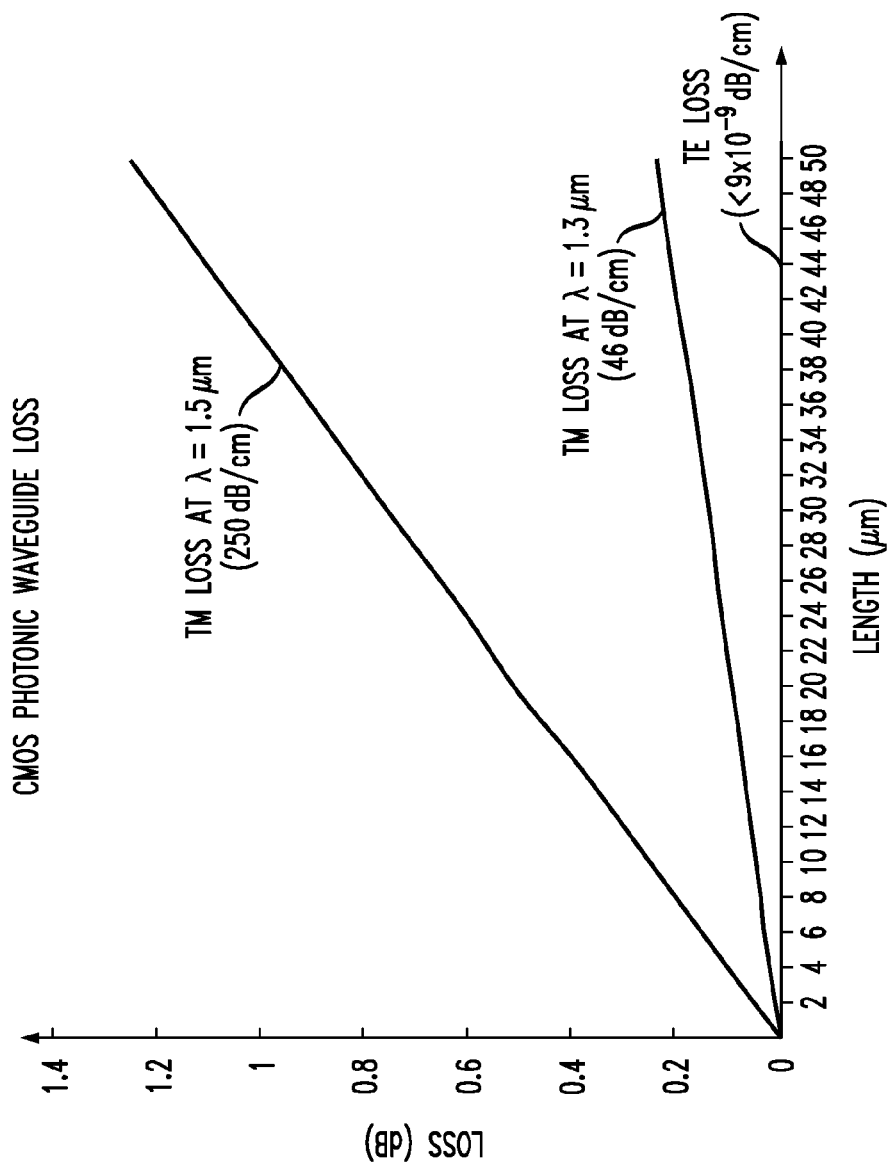
FIG. 2 is a plot of TM and TE loss as a function of length for an optical signal propagating along a silicon optical waveguide.

Although not directly shown in the diagram of FIG. 1, an on-going concern, as mentioned above, is the presence of polarization-dependent loss in the received optical signal R. If there is no attempt to utilize polarization-maintaining optics at the input of circuit 1 (including the use of a polarization-maintaining waveguide 2), the incoming, received signal R will be of "mixed" polarization, including both TE and TM components. FIG. 2 is a diagram showing both TE and TM loss associated with an optical signal propagating along a silicon-based optical waveguide. As shown, the propagation loss associated with the TE mode is essentially negligible (i.e., less than $9 \times 10^{-9}$ dB/cm). However, the loss associated with the propagating TM mode is relatively large, having a value of about 250 dB/cm at a wavelength of 1.5 µm, and a value of about 46 dB/cm at a wavelength of 1.3 µm. As both polarization components propagating along waveguide 6, the TM component will continue to experience a greater degree of loss, as depicted in the graph of FIG. 2. In most cases, therefore, polarization controlling optics are used at the input (or at some point along waveguide 6) to re-orient the TM polarized signal along the TE axis and minimize the loss associated with the propagating TM mode.

The addition of polarization controlling optics is considered to be a relatively costly proposition, adding components and complexity to the opto-electronic circuit arrangement.

Figure 3:
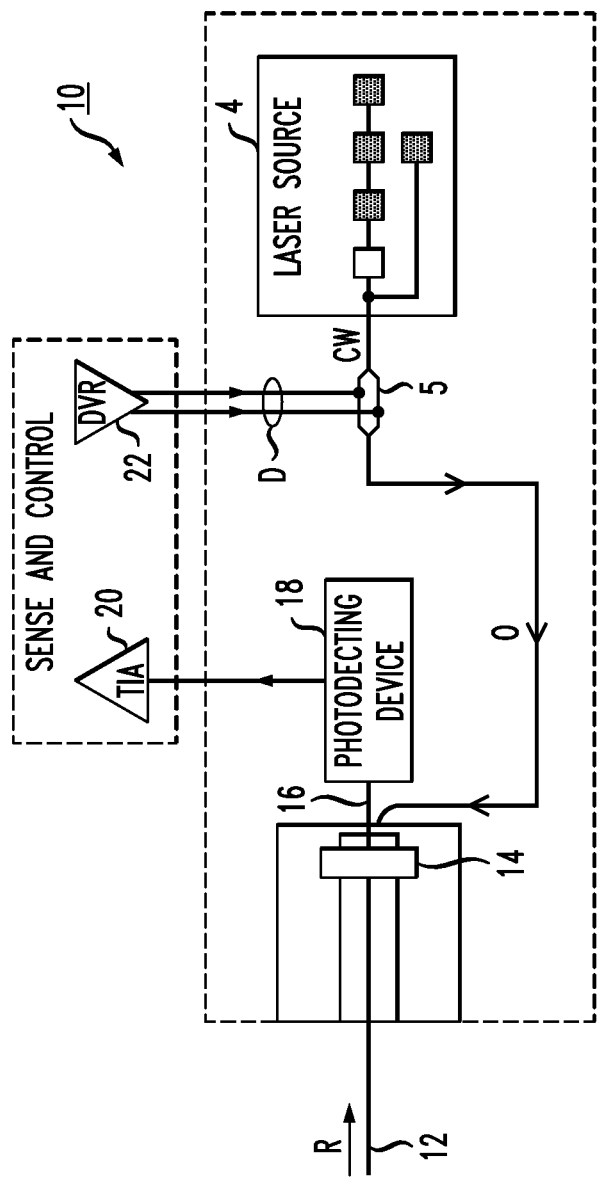
FIG. 3 is a top view of an arrangement formed in accordance with the present invention, where the photodetecting device is positioned to intercept an optical signal after propagating only a short length optical waveguide.

In accordance with the present invention, therefore, an alternative topology for an opto-electronic integrated circuit is proposed, as shown in FIG. 3, which addresses the polarization dependent loss problem of the prior art without the need to add costly polarization-correcting optics.

FIG. 3 is a top view of an exemplary opto-electronic integrated circuit 10 formed in accordance with the present invention. As shown, the components associated with receiving an incoming optical signal R and transforming this optical signal into the equivalent electrical data are positioned as close as possible to the entry point of the incoming optical signal to integrated circuit 10. In this particular embodiment, an optical fiber 12 is used to provide optical signal R to integrated circuit 10 (alternatively, a free space propagating optical signal R or an optical signal propagating along a planar optical waveguide from a separate component may be utilized to provide optical signal R to opto-electronic integrated circuit 10).

Figure 4:
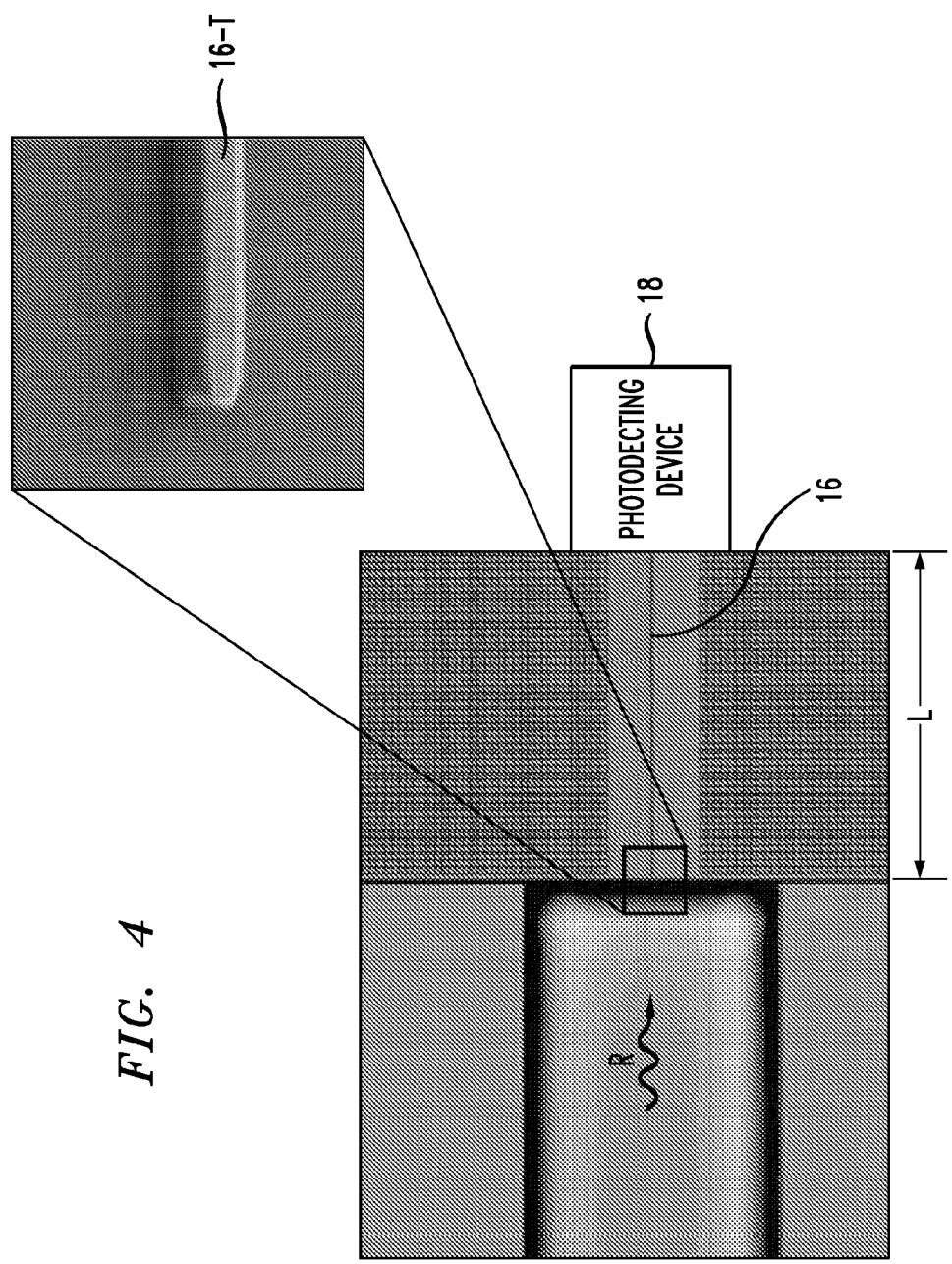
FIG. 4 is an enlarged view of the combination of the short length optical waveguide and photodetecting device formed in accordance with the present invention.

In the particular embodiment of FIG. 3, optical fiber 12 is shown as terminating at a lens 14, which functions to focus received optical signal R into a short optical waveguide 16. In accordance with the present invention, a photodetecting device 18 is shown as being positioned along short optical waveguide 16 to intercept optical signal R and convert this signal into an electrical equivalent. FIG. 4 is an enlarged view of short optical waveguide 16 and photodetecting device 18 as positioned to receive optical signal R. Short optical waveguide 16 is formed to have a length L that is selected to limit the optical signal loss associated with the propagation of the TM mode. For example, for a configuration where L=10 µm, the loss would be on the order of only 0.25 dB at $\lambda$=1.5 µm or 0.046 db at $\lambda$=1.3 µm. The value of 10 µm is exemplary only and is known to be a function of wavelength of the propagating optical signal. In general, the short length of optical waveguide 16 is selected as a function of the specific application and the amount of polarization-dependent loss that can be tolerated (for example, limited loss to a value of less than 1 dB). In other configurations, an acceptable level of loss may be defined as the maximum allowable system-level tolerance to signal variation while maintaining adequate signal integrity.

FIG. 4 also includes an inset of an enlarged view of the end region of short optical waveguide 16, which in this case is formed as a nanotaper end termination 16-T. While not required, the utilization of a nanotaper end termination will improve the coupling efficiency of a propagating optical signal into short optical waveguide 16. In an exemplary embodiment optical waveguide 16 is formed of the same semiconductor material as photodetecting device 18 (for example, germanium may be used for the both the waveguide and the detector—the choice of germanium being exemplary only), where the use of the same material for the waveguide and the photodetector will further decrease the propagation loss associated with the TM mode of the optical signal.

It has been found that by positioning photodetecting device 18 close to the location where received optical signal R enters opto-electronic integrated circuit 10, the TM mode loss of the propagating optical signal is sufficiently low to be negligible for most commercial system designs. That is, since the received optical signal R does not have to propagate along a relatively long length (e.g., hundreds of microns) of optical waveguide before arriving at the photodetecting device (as common in conventional arrangements, as shown in the prior art arrangement as shown in FIG. 1), the minimal amount of polarization-dependent loss can be ignored. Once the received optical signal has been transformed into its electrical equivalent, similar processing continues (such as using a transimpedance amplifier 20) to recover an acceptable electrical data signal.

In the particular arrangement as shown in FIG. 3, a tunable laser source 4 and modulator 5 (equivalent to the prior art arrangement described above) are disposed at locations that allow for a relatively compact opto-electronic circuit to be created. In this case, the electronics for both the receiver (e.g., transimpedance amplifier 20) and transmitter (e.g., a driver circuit 22) are formed in a common electronic module disposed adjacent to opto-electronic integrated circuit 10. This should only be considered as an exemplary embodiment; any other suitable arrangement of opto-electronic components associated with the transmission portion of the circuit may be utilized if, indeed, transmission components form part of opto-electronic integrated circuit 10.

Having described the present invention in detail and by reference to specific embodiments thereof, it will be apparent that modifications and variations are possible without departing from the scope of the invention defined in the appended claims. More specifically, although some aspects of the present invention are identified herein as preferred or particularly advantageous it is contemplated that the present invention is not necessarily limited to those preferred aspects of the invention.

What is claimed is:

1. A silicon-based opto-electronic circuit formed on a silicon substrate, the circuit comprising:
   an optical waveguide of a predetermined length separating an input of the optical waveguide from an output of the optical waveguide, the optical waveguide is formed in the silicon substrate and configured to receive an optical signal at the input of the optical waveguide, wherein the optical signal exhibits both transverse electric (TE) and transverse magnetic (TM) components, and a propagation direction of the optical signal is aligned with the input of the optical waveguide and the output of the optical waveguide; and
   a photodetecting device disposed contiguous to the optical waveguide for capturing the received optical signal departing the output of the optical waveguide and converting the captured optical signal into an electrical equivalent,
   wherein the predetermined length of the optical waveguide is selected such that a polarization dependent loss associated with the TM component of the received optical signal is negligible.

2. The silicon-based opto-electronic circuit as defined in claim 1, wherein the optical waveguide includes a silicon nanotaper optical waveguide.

3. The silicon-based opto-electronic circuit as defined in claim 1, wherein the optical waveguide comprises an optical path between the input of the optical waveguide and the output of the optical waveguide, and the optical path having the predetermined length.

4. The silicon-based opto-electronic circuit as defined in claim 1, further comprising an optical fiber for supporting propagation of the optical signal, and an output of the optical fiber coupled to the input of the optical waveguide.

5. The silicon-based opto-electronic circuit as defined in claim 1, further comprising a planar optical waveguide for supporting propagation of the optical signal, and an output of the planar optical waveguide coupled to the input of the optical waveguide.

6. The silicon-based opto-electronic circuit as defined in claim 1, wherein the predetermined length of the optical waveguide is selected to limit TM mode loss to a value of less than one (1) decibel.

7. The silicon-based opto-electronic circuit as defined in claim 1, wherein the predetermined length of the optical waveguide is selected to limit TM mode loss to a level that maximizes allowable system-level tolerance to signal variation.

8. The silicon-based opto-electronic circuit as defined in claim 1, wherein the optical waveguide and the photodetecting device are formed of a same material.

9. The silicon-based opto-electronic circuit as defined in claim 8, wherein the optical waveguide and the photodetecting device comprise germanium.

10. The silicon-based opto-electronic circuit as defined in claim 1, wherein the input of the optical waveguide is disposed at a first end of the optical waveguide, the output of the optical waveguide is disposed at a second end of the optical waveguide, and the first end is opposite the second end.

11. A silicon-based opto-electronic circuit formed on a silicon substrate, the circuit comprising:
    an optical waveguide of a predetermined length separating an input of the optical waveguide from an output of the optical waveguide, the optical waveguide is formed in the silicon substrate and configured to receive an incoming, received optical signal at the input of the optical waveguide, wherein the incoming, received optical signal exhibits both transverse electric (TE) and transverse magnetic (TM) components; and
    a photodetectinq device disposed contiguous to the optical waveguide for capturing the received optical signal departing the output of the optical waveguide and converting the captured optical signal into an electrical equivalent,
    wherein the optoelectronic circuit further comprises a lens disposed at the input to the optical waveguide.

12. The silicon-based opto-electronic circuit as defined in claim 11, wherein the optical waveguide is disposed between the lens and the photodetecting device.

13. A silicon-based opto-electronic circuit formed on a silicon substrate, the circuit comprising:
    a photodetecting device for receiving an optical signal and converting the optical signal into an electrical equivalent signal, the optical signal including both transverse electric (TE) and transverse magnetic (TM) components; and
    an optical waveguide formed in the silicon substrate, the optical waveguide comprising an optical waveguide body including a first port and a second port opposite the first port, the first port configured to receive the optical signal from an optical fiber, the optical waveguide body configured to transmit the optical signal between the first port and the second port which are separated by a predetermined length,
    wherein the predetermined length is configured to limit a loss associated with the TM component of the optical signal to less than one (1) decibel for a wavelength of the optical signal less than 1.5 microns.

14. The silicon-based opto-electronic circuit as defined in claim 13, further comprising a terminating end portion of an optical fiber, wherein the optical waveguide is disposed between the photodetecting device and the terminating end portion of the optical fiber.

15. The silicon-based opto-electronic circuit as defined in claim 14, wherein the predetermined length is less than forty (40) microns.

16. A method, comprising:
 receiving an optical signal at an input port of an optical waveguide, wherein a propagation direction of the optical signal is aligned with the input port and an output port of the optical waveguide, wherein the optical signal exhibits both transverse electric (TE) and transverse magnetic (TM) components;
 transmitting, using the optical waveguide, the optical signal from the input port to the output port along a predetermined length of the optical waveguide, wherein the predetermined length of the optical waveguide is selected such that a polarization dependent loss associated with the TM component of the received optical signal is negligible;
 capturing the optical signal from the output port of the optical waveguide using a photodetecting device disposed contiguous to the output port of the optical waveguide; and
 converting the captured optical signal into an electrical equivalent using the photodetecting device.

17. The method of claim 16, further comprising transmitting the optical signal from an optical fiber to the input port of the optical waveguide.

18. The method of claim 16, wherein the predetermined length of the optical waveguide is selected to limit TM mode loss to a value of less than one (1) decibel.

19. The method of claim 16, wherein the predetermined length is less than forty (40) microns.

* * * * *